United States Patent [19]
Doubrava

[11] Patent Number: 5,134,253
[45] Date of Patent: Jul. 28, 1992

[54] DIGITIZER EMPLOYING LOOPBACK CONDUCTOR PATTERN USING ROTATION SEQUENCING

[75] Inventor: Dana Doubrava, Phoenix, Ariz.

[73] Assignee: CalComp, Inc., Anaheim, Calif.

[21] Appl. No.: 714,675

[22] Filed: Jun. 13, 1991

[51] Int. Cl.⁵ .............................................. G08C 21/00
[52] U.S. Cl. ...................................... 178/19; 178/18
[58] Field of Search .................................... 178/18, 19

[56] References Cited

U.S. PATENT DOCUMENTS

| | | | |
|---|---|---|---|
| 4,210,775 | 7/1980 | Rodgers et al. | 178/19 |
| 4,661,656 | 4/1987 | Rodgers et al. | 178/18 |
| 4,734,546 | 3/1988 | Landmeier | 178/19 |
| 4,736,073 | 4/1988 | Abernethy | 178/19 |
| 4,806,918 | 2/1989 | Berke et al. | 178/18 |
| 4,831,216 | 5/1989 | Landmeier | 178/19 |
| 4,835,347 | 5/1989 | Watson | 178/19 |
| 4,859,813 | 8/1989 | Rockwell | 178/18 |
| 5,051,545 | 9/1991 | McDermott | 178/19 |

*Primary Examiner*—Stafford D. Schreyer
*Attorney, Agent, or Firm*—Cesari and McKenna

[57] ABSTRACT

A loopback conductor arrangement for a digitizer grid employs rotation sequencing of the conductors. The conductors in each of the X- and Y-directions are looped back and forth in a parallel, spaced relationship across the active grid area so as to provide a plurality of crossing conductor segments, with the positions of selected conductors (e.g., alternate conductors) in each successive loop shifting in sequential positions by a constant offset with respect to the other conductors in those loops.

16 Claims, 6 Drawing Sheets

16 WIRE ROTATE EVEN BY ONE

16 WIRE ROTATE ODD BY ONE

15 WIRES ROTATE EVEN BY 1

15 WIRES ROTATE ODD BY 1

15/16 WIRES ROTATE ODD BY 1 ADD NEW ODD
AND REMOVE OLD ODD

| 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | -1 | -2 | -3 | -4 | -5 | -6 | -7 | -8 | -9 | -10 | -11 | -12 | -13 | -14 |
| 0 | 15 | 2 | 1 | 4 | 3 | 6 | 5 | 8 | 7 | 10 | 9 | 12 | 11 | 14 |
| 0 | -15 | -2 | -1 | -4 | -3 | -6 | -5 | -8 | -7 | -10 | -9 | -12 | -11 | -14 |
| 0 | 13 | 2 | 15 | 4 | 1 | 6 | 3 | 8 | 5 | 10 | 7 | 12 | 9 | 14 |
| 0 | -13 | -2 | -15 | -4 | -1 | -6 | -3 | -8 | -5 | -10 | -7 | -12 | -9 | -14 |
| 0 | 11 | 2 | 13 | 4 | 15 | 6 | 1 | 8 | 3 | 10 | 5 | 12 | 7 | 14 |
| 0 | -11 | -2 | -13 | -4 | -15 | -6 | -1 | -8 | -3 | -10 | -5 | -12 | -7 | -14 |
| 0 | 9 | 2 | 11 | 4 | 13 | 6 | 15 | 8 | 1 | 10 | 3 | 12 | 5 | 14 |
| 0 | -9 | -2 | -11 | -4 | -13 | -6 | -15 | -8 | -1 | -10 | -3 | -12 | -5 | -14 |
| 0 | 7 | 2 | 9 | 4 | 11 | 6 | 13 | 8 | 15 | 10 | 1 | 12 | 3 | 14 |
| 0 | -7 | -2 | -9 | -4 | -11 | -6 | -13 | -8 | -15 | -10 | -1 | -12 | -3 | -14 |
| 0 | 5 | 2 | 7 | 4 | 9 | 6 | 11 | 8 | 13 | 10 | 15 | 12 | 1 | 14 |
| 0 | -5 | -2 | -7 | -4 | -9 | -6 | -11 | -8 | -13 | -10 | -15 | -12 | -1 | -14 |
| 0 | 3 | 2 | 5 | 4 | 7 | 6 | 9 | 8 | 11 | 10 | 13 | 12 | 15 | 14 |
| 0 | -3 | -2 | -5 | -4 | -7 | -6 | -9 | -8 | -11 | -10 | -13 | -12 | -15 | -14 |

FIG. 8

DIGITIZER EMPLOYING LOOPBACK CONDUCTOR PATTERN USING ROTATION SEQUENCING

FIELD OF THE INVENTION

This invention relates generally to digitizers, and more particularly to high-resolution digitizers employing loopback conductor patterns.

BACKGROUND OF THE INVENTION

Digitizers, or digitizing tablets as they are sometimes called, are used for generating digital signals representative of the positions of coils relative to active areas defined by grids of conductors. The coils are carried, for instance, in the tips of hand-held or machine-held, movable instruments (e.g., pointers, pens, styluses, or cursors).

A typical digitizer conductor grid has a first group of parallel, spaced conductors oriented generally in an X-direction, and a second group of parallel, spaced conductors oriented generally in a Y-direction perpendicularly to the first group, thereby defining an orthogonal X-Y coordinate system. The conductors can be formed, for instance, by wires or by paths of conductive ink disposed on a non-conductive substrate.

The digitizer also typically has an alternating-current (AC) source, such as an oscillator, and signal detection circuitry. The AC source supplies an AC signal of a predetermined frequency and amplitude, for instance, to the coil of the movable instrument. The coil signal is inductively coupled to the conductors of the grid, thereby inducing AC signals in the conductors. The detection circuitry senses the induced AC signals, and generates a signal indicative of, for example, its magnitude and, in some digitizers, other signal characteristics as well. A signal processor in the detection circuitry processes these signals to determine the position of the coil with respect to the grid.

The conductors are connected to the detection circuitry by multiplexers (MUX's). The MUX's and the detection circuitry typically are provided on a single printed circuit board, which can be called the "digitizer PC board."

Significant characteristics of digitizers include the size of the grid active areas and the exhibited resolutions in determinations of coil positions. The grid active-area size generally depends on the number and arrangement of conductors used in the digitizer grid and the inter-conductor spacing within the grid. The digitizer resolution generally depends on the conductor arrangement, the inter-conductor spacing and the type of detection circuitry employed.

It has been found that the grid conductors can be arranged advantageously in various "loopback" patterns within the grid. In a loopback pattern, conductors in the digitizer grid are looped repeatedly back and forth across an active area of the grid. Loopback patterns increase the active area of the grid for a specified digitizer resolution, or increase the digitizer resolution for a specified grid active area. In either case, loopback patterns generally minimize the number of grid conductors and the number of MUX's required, and, thus, realize savings in component costs.

Digitizers incorporating various, alternative loopback patterns have been proposed in the prior art. For instance, U.S. Pat. No. 4,661,656 to Rodgers discloses a digitizer in which three main conductors A, B, and C in each of the X and Y conductor groups are disposed in the following loopback pattern (as one moves from one end of the grid to the other):

A+, B+, C+, A−, B−, C−, A+, B+, C+, etc.

where the signs designate directional polarities in each loop of the conductors. This scheme has the effect of dividing the grid active area into a plurality of equal-width sections; each section contains, e.g., six segments of the conductors, the first three being of positive (+) polarity and the next three being of negative (−) polarity.

Rodgers uses auxiliary conductors connected to the just-described looped conductors through a series of resistor taps to identify the particular section of the tablet that contains the coil. Rodgers then finds the looped conductor with the lowest absolute induced signal value, and the looped conductor with both the next lowest absolute induced signal value and a polarity reversal to determine the position of the coil within the given section. Unfortunately, the auxiliary conductors represent complexities in the design and implementation of the digitizer, and, therefore, increase the costs of the device.

Commonly assigned U.S. Pat. No. 4,734,546 to Landmeier discloses a digitizer system employing a conductor grid with a loopback pattern, in which the grid is divided into a plurality of sections. The conductors are passed through the sections in a predetermined order so that the combination of the directional polarities of adjacent conductor segments is different in each section. Due to these known and differing directional polarities, each section of the grid active area is uniquely identifiable and distinquishable from the others, even though formed by the same conductors.

Consequently, this arrangement reduces the number of separate conductors required to span the grid active area and the number of multiplexers required to couple the conductors to the detection circuitry. For example, by looping the conductors in pairs through four equally sized quarter sections of the grid, as taught in the illustrative embodiment of that patent, 16 conductors in each group can be used to span the same active area that would require 64 conductors without a loopback arrangement. Moreover, one 16-input multiplexer can be used for each group that would require four such multiplexers absent a loopback arrangement, all without the need for a group of auxiliary conductors.

Commonly assigned U.S. Pat. No. 4,831,216 to Landmeier discloses an improvement over the earlier Landmeier patent, in which the digitizer system employs primary and secondary interleaved sets of conductors. The primary set of conductors is formed by looping spaced conductors in pairs through different sections of the grid active area in such a way that the directional polarities of each pair are different in each section. The secondary set of conductors is formed by looping at least one additional conductor back and forth through the active area in the spaces between the conductor pairs of the primary set.

In a digitizer employing a loopback arrangement of that type, adjacent conductor segments are spaced from one another typically by about 0.4 inch (one centimeter) or less. Thus, it is possible to span an active area extending about 25.2 inches (64 centimeters) (i.e., 63 spaces times 0.4 inch) using 16 conductors and one 16-input multiplexer.

For larger grid active areas, either the spacing between adjacent conductor segments is increased, or additional conductors and additional multiplexers is used. In the former case, accuracy is sacrificed, while in the latter case, costs associated with components and manufacturing increase.

U.S. Pat. No. 4,835,347 to Watson discloses the use of a digitizer grid, which accommodates large grid active areas without sacrificing accuracy or significantly increasing costs. The conductors in each group in the Watson patent are separated into first and second sets of conductors, each such set including a different number of conductors. For example, 15 conductors can be used in each direction, separated into a set of seven conductors and a set of eight conductors.

In the loopback pattern in accordance with that patent, the individual conductors in the first and second sets shift in position relative to one another. For example, at the extreme left of the active area, conductor A of the second set is to the immediate right of the conductor 1 of the first set. In their next crossing, conductor A of the second set is to the immediate left of conductor 1 of the first set. This positional shifting, which is due solely to the fact that each set includes a different number of conductors, continues all the way to the extreme right of the active area.

In the example mentioned above, where each conductor group has an 8-conductor set and a 7-conductor set that are looped and interleaved across the grid active area as just described, and where adjacent conductor segments are equally spaced from one another by 0.4 inch, unique positional and directional polarity relationships between individual segments are obtained for up to 14 crossings of the first set. This permits the active grid area to be as large as 89.6 inches (228 centimeters) (14 first set crossings times 0.4 inch). Thus, the Watson approach provides more than three times the grid active area achievable with the scheme of the Landmeier '216 patent.

It would be desirable to provide a digitizer employing a loopback pattern realizing most or all of the advantages of Watson, while providing an even more flexible design of the grid active area that can be readily manufactured and provide accurate and reliable measurements of coil positions.

SUMMARY OF THE INVENTION

The present invention resides in a loopback conductor arrangement for a digitizer grid, which employs "rotation sequencing" of the conductors. The conductors in each of the X- and Y-directions are looped back and forth in a generally parallel, spaced relationship across the active grid area so as to provide a plurality of crossing conductor segments, with the positions of selected conductors (e.g., alternate conductors having odd or even numbers) in each successive loop shifting in positions by a predetermined and preferably constant offset with respect to the other conductors in those loops. The offset is independent of the number of conductors used in the digitizer grid. The rotation sequencing provides each loop with a sequence of conductors that is uniquely different from the other loops.

More specifically, the conductors in each group (i.e., direction) are separated into first and second sets of conductors. The conductors are looped back and forth across the grid active area in a pre-determined order. In the first loop, the conductors of the first and second sets are arranged in alternation, i.e., first a conductor of the first set, then one of the second set, followed by another of the first set, etc. Thus, if we number the conductors in the first loop starting with zero, the first set can be called the "even-numbered" conductors, and the second set can be called the "odd-numbered" conductors.

In the second loop, the sequential positioning of the conductors in one or both of the sets is changed in accordance with a pre-selected and preferably uniform pattern. In accordance with the invention, for instance, each even-numbered or odd-numbered conductor's position in the sequence forming the loop is shifted by a constant offset. Thus, in the second loop, each even-numbered or odd-numbered conductor's position in the sequence is moved in one direction or the other so that each such conductor is located between a pair of the conductors of the other set that is different from the pair between which the conductor was located in the first loop. This position shifting is repeated in successive loops of the conductors across the grid active area. Thus, each loop is characterized by a unique sequence of conductors.

The following example will clarify the principles of the invention. Where five conductors form the grid active area, they can be designated conductor no. 0 through conductor no. 4, with the even-numbered conductors being conductor nos. 0, 2 and 4, and the odd-numbered conductors being conductor nos. 1 and 3. In the first loop, the conductors can be arranged in numerical order. If the rotation sequencing scheme were "Odd, Add One," then, in the second loop, the conductors are arranged in the following order:

0, 3, 2, 1, 4.

Thus, the position of odd-numbered conductor no. 1 is moved in the positive direction (which is defined as left-to-right across this page) by one odd-numbered conductor position, and, thereby, assumes the position in the sequence formerly held by conductor no. 3 in the first loop. Likewise, the position of odd-numbered conductor no. 3 is moved in the positive direction by one odd-numbered conductor position, and, thereby, assumes the position in the sequence formerly held by conductor no. 1 in the first loop.

Viewed another way, if the distinction between the conductor sets is disregarded, each odd-numbered conductor moves in the example by a total of two conductor positions in the loops, e.g., conductor no. 1 moved from the second to the forth position or segment in the second loop, yielding a total positional difference of two. This offset can be called a "rotation offset," because, for instance, conductor no. 3 in the above example is moved in loop no. 2 into the former sequential position of conductor no. 1 in loop no. 1, thus forming, in effect, a rotation.

In alternative embodiments of the invention, the rotation offset for either conductor set can be positive or negative, and can be of any magnitude. In addition, both conductor sets, and not just a single one of the sets, can undergo rotation sequencing. For example, odd conductors can undergo a rotation offset of two in a positive direction (i.e., "Odd, Add One"), while even conductors can undergo a rotation offset of two in the other direction (i.e., "Even, Subtract One").

Further embodiments employ an interleaved, additional conductor as well as one of the above-described rotation schemes.

A digitizer embodying the invention can accurately determine the position of the coil of the movable instrument. Because each loop has a unique conductor sequence, and because the conductors are looped back and forth across the active area so that the directional polarities of the segments shift or reverse within each loop, the positional relationships and the directional/-polarities of the segments within each loop permit the signal-processing circuitry to identify uniquely the location of the coil within the active area using a known sequential scanning approach.

As mentioned above, however, it is the novel layout of the conductors that is at the heart of the invention. The rotation-shifting, loopback layout provided by the invention permits either the use of fewer conductors for a given-size grid, or the same number of conductors for a larger grid, and, in either case, with no significant sacrifice in digitizer resolution. Of course, it is also possible with the invention to increase the digitizer resolution for a particular number of conductors and a particular grid size.

In the practice of the invention, any number of conductors can be utilized, and the conductors can be grounded on the same side of the grid, preferably on the side closest to the digitizer PC board. Indeed, preferably both the leading and trailing ends of the conductors are located on the same side of the digitizer PC board so as to facilitate electrical connection therewith.

In addition, in the practice of the invention, the conductors can have substantially the same overall length from the digitizer PC board (more specifically, from the multiplexers mounted thereon) to ground, and therefore can exhibit substantially the same electrical resistance to facilitate determination of the coil position by the digitizer.

Furthermore, the rotation offset that provides the unique sequencing of conductors in each loop is independent of the number of conductors in the conductor sets.

Thus, the invention can improve the ease and flexibility of the design and fabrication of digitizers, and reduce costs associated therewith, and can improve their operation.

BRIEF DESCRIPTION OF THE DRAWING

The above and further advantages of the invention may be better understood by referring to the following description in conjunction with the accompanying drawings, in which:

FIG. 4 shows a table representing all possible conductor positions of "Even by One" rotation sequencing of 16 conductors in accordance with the invention;

FIG. 5 shows a table representing all possible conductor positions of "Odd by One" rotation sequencing of 16 conductors in accordance with the invention;

FIG. 6 shows a table representing all possible conductor positions of "Even by One" rotation sequencing of 15 conductors in accordance with the invention;

FIG. 7 shows a table representing all possible conductor positions of "Odd by One" rotation sequencing of 15 conductors in accordance with the invention; and FIG. 8 shows a table representing all possible conductor positions of yet a further, more complicated rotation sequencing scheme in accordance with the invention.

DETAILED DESCRIPTION OF ILLUSTRATIVE EMBODIMENT

Figure 1:
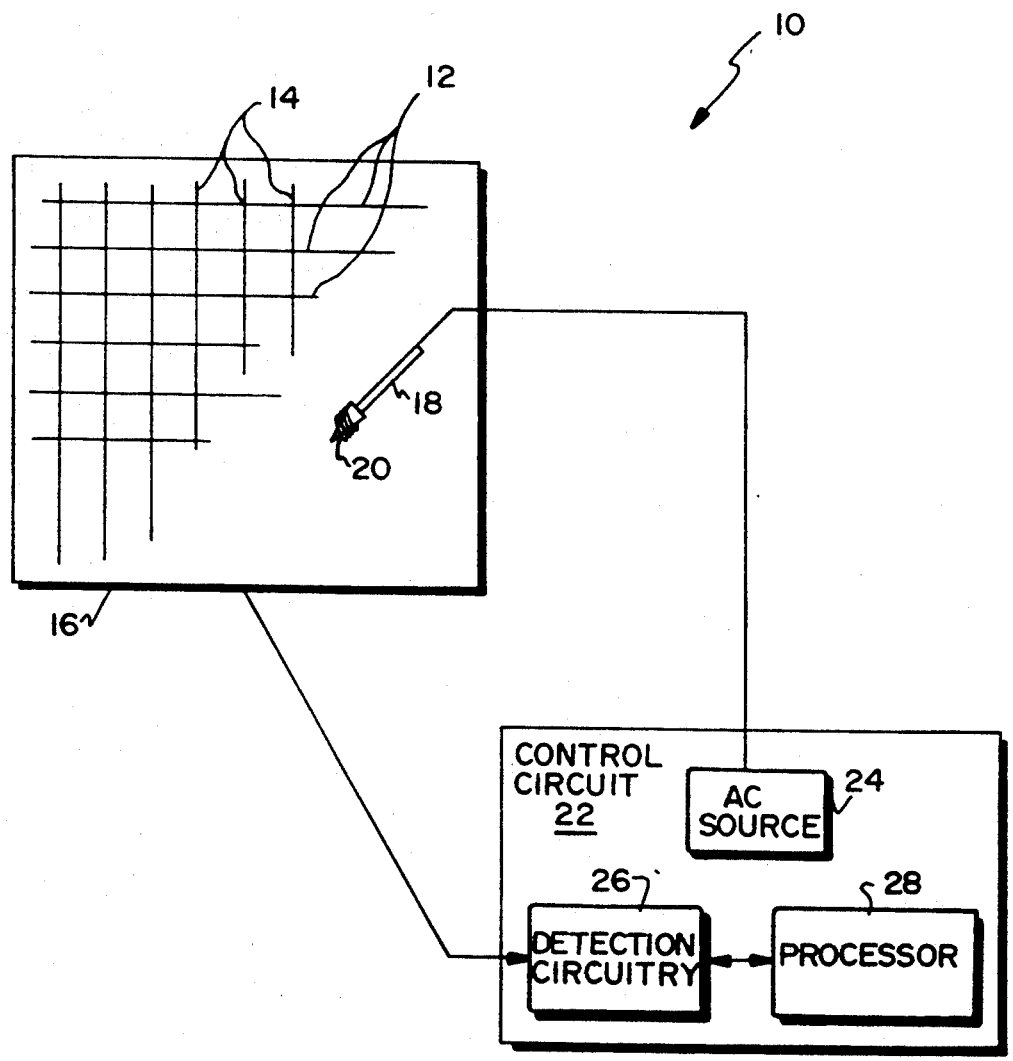
FIG. 1 is a block diagram of a digitizer in accordance with the invention.

FIG. 1 shows a digitizer 10 in accordance with the invention having a plurality of conductors 12 in the X-direction, and a plurality of conductors 14 in the Y-direction, which together define both a grid of conductors and a generally planar grid active area 16. The conductors 12, 14 can be, for example, in the form of conductive wires, or paths of conductive ink disposed on a nonconductive substrate of, e.g., glass or Mylar brand material. The fabrication of the conductors 12, 14 is conventional.

The digitizer 10 also has a conventional movable instrument 18, e.g., a pointer, pen or stylus, whose tip carries a coil 20. The instrument 18 is disposed during use along the grid active area 16, and in close proximity to the plane defined by the grid of conductors 12, 14.

In addition, the digitizer 10 has a conventional control circuit 22. The control circuit 22 includes an AC supply 24, detection circuitry 26, and a signal processor 28. The AC supply 24 energizes the coil 20. The detection circuitry 26 senses the currents induced in the conductors 12, 14 by the coil currents. The signal processor 28 receives signals from the detection circuitry 26 indicative of, e.g., the magnitude and polarity of the induced currents, from which the processor determines the position of the coil 20 within the grid active area 16. A suitable control circuit 22 is disclosed by the abovedescribed U.S. Pat. No. 4,835,347 to Watson, which is incorporated by reference.

"Odd, Plus One" 5-Conductor Active Grid

Figure 2:
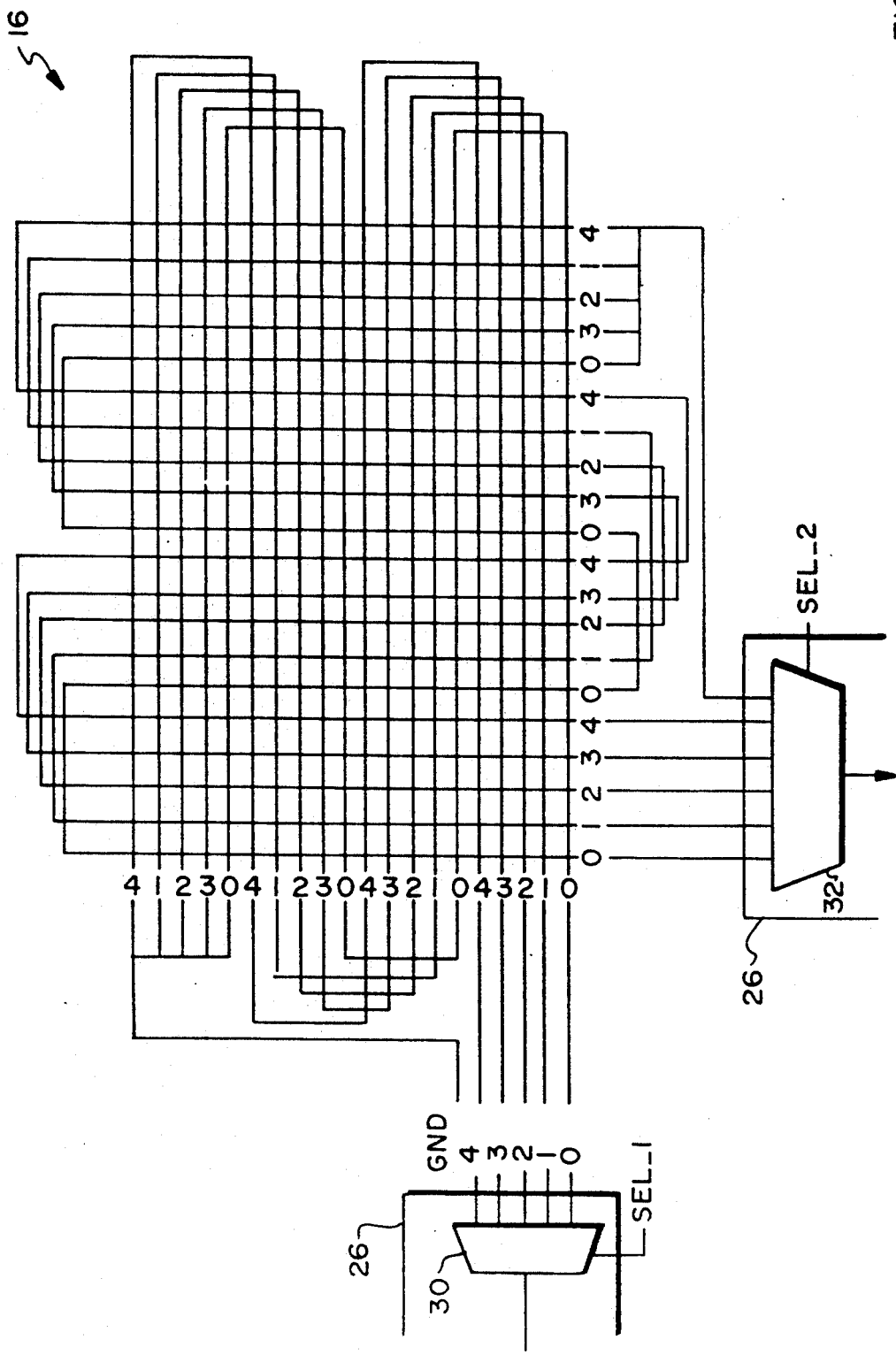
FIG. 2 is a more detailed illustration of the active grid area and the multiplexers of the detection circuitry 26 of the digitizer of FIG. 1, showing "Odd, Add One" rotation sequencing of five conductors in each of the X- and Y-directions.

FIG. 2 shows the grid active area 16 in greater detail as comprising conductors 12, 14 arranged in a loopback arrangement that employs rotation sequencing of the conductor segments in accordance with an illustrative embodiment of the invention. In that drawing, five conductors 12, 14 in each of the X- and Y-directions are looped back and forth in a parallel, spaced relationship across the active grid area so as to provide twenty conductor segments exhibiting a rotation sequencing of "Odd Plus One."

Since the same number of conductors and type of rotation sequencing is employed in each direction, we will only describe the X-direction conductors in detail. It should be understood that the description applies as well to the Y-direction conductors. Also, it should be understood that other numbers of conductors and segments, and other rotation sequencing schemes, can be used. Indeed it is not necessary for the same number of conductors or segments or the same rotation sequencing scheme to be used for both conductor groups.

For ease in description, the five conductors can be numbered sequentially 0 to 4, and the conductor segments can be numbered sequentially 0 to 19. In addition, the conductors in each loop can be assigned a positive sign if extending from left to right in the drawing, and a negative sign if extending from right to left in the drawing. The conductor segments can be considered virtual conductors.

The interrelationship between the actual and virtual conductors in the illustrative grid can best be appreciated from the following table:

| CONDUCTOR SEGMENT NO. | CONDUCTOR NUMBER | LOOP NUMBER | ROTATION OFFSET |
| --- | --- | --- | --- |
| 0 | +0 | 1 | 0 |
| 1 | +1 | 1 | 0 |
| 2 | +2 | 1 | 0 |
| 3 | +3 | 1 | 0 |
| 4 | +4 | 1 | 0 |
| 5 | −0 | 1 | 0 |
| 6 | −1 | 1 | 0 |
| 7 | −2 | 1 | 0 |
| 8 | −3 | 1 | 0 |
| 9 | −4 | 1 | 0 |
| 10 | +0 | 2 | 0 |
| 11 | +3 | 2 | 2 |
| 12 | +2 | 2 | 0 |
| 13 | +1 | 2 | 2 |
| 14 | +4 | 2 | 0 |
| 15 | −0 | 2 | 0 |
| 16 | −3 | 2 | 2 |
| 17 | −2 | 2 | 0 |
| 18 | −1 | 2 | 2 |
| 19 | −4 | 2 | 0 |

As can be seen from the foregoing table, and as illustrated in FIG. 2, each odd-numbered conductor (i.e., each of conductor nos. 1 and 3) in consecutive loops is shifted by one odd-numbered-conductor position. Therefore, conductor no. 1 in loop no. 2 takes on the position in loop no. 2 formerly held by conductor no. 3, i.e., the next odd-numbered conductor, in loop no. 1. Moreover, conductor no. 3 also shifts to the next odd-numbered conductor position, but, since there are no higher odd-numbered conductors, it "rotates" back around positionally, and assumes the position of conductor no. 1. The other conductors assume the same relative positions from loop to loop.

Viewed another way, a variable called "rotation offset" can be defined as the total shift in conductor segment positions, disregarding the distinction between conductor sets (i.e., between odd- and even-numbered conductors). In the illustration just described, both conductor nos. 1 and 3 have rotation offsets of two, while the rest of the conductors have zero rotation offsets. Thus, for instance, conductor no. 1 forms segment nos. 1 and 6 in the first loop. Then, in the second loop, due to the rotation offset of two, instead of forming segment nos. 11 and 16, conductor no. 1 forms segments nos. 13 and 18 (i.e., 11+2=13, and 16+2=18).

Continuing with respect to FIG. 2, each conductor 12, 14 in the X- and Y-direction is connected to ground at one end, and loops back and forth across the active area until, at the other end, each is connected to a switchable input of a respective multiplexer 30, 32. The multiplexers 30, 32 are part of the detection circuitry 26, and receive input selection signals SEL__1 and SEL__2 at multiplexer control inputs thereof from the signal processor 28.

When the coil 20 induces currents in the conductors 12, 14, the signal processor 28 causes the multiplexers 30, 32 to pass sequentially the signals from the conductors 12, 14 by appropriately setting SEL__1 and SEL__2.

As described, each loop has a unique sequencing of conductors. Moreover, because the conductors extend back and forth across the active area, the directional polarities of the conductor segments shift or reverse within each loop. The shifting positional relationships and directional/polarity relationships permit conventional signal-processing circuitry to identify uniquely the location of the coil within the active area using a known sequential scanning approach, such as that taught in the above-referenced Watson and Landmeier patents.

Preferably, and as shown, the ground and multiplexer-connected ends of all the conductors 12, 14 are located on the same side of the grid active area. This facilitates manufacture, and assures that all conductors 12, 14 have substantially the same resistances.

"Odd, Subtract Two, Add Extra Wire" Active Grid

Figure 3:
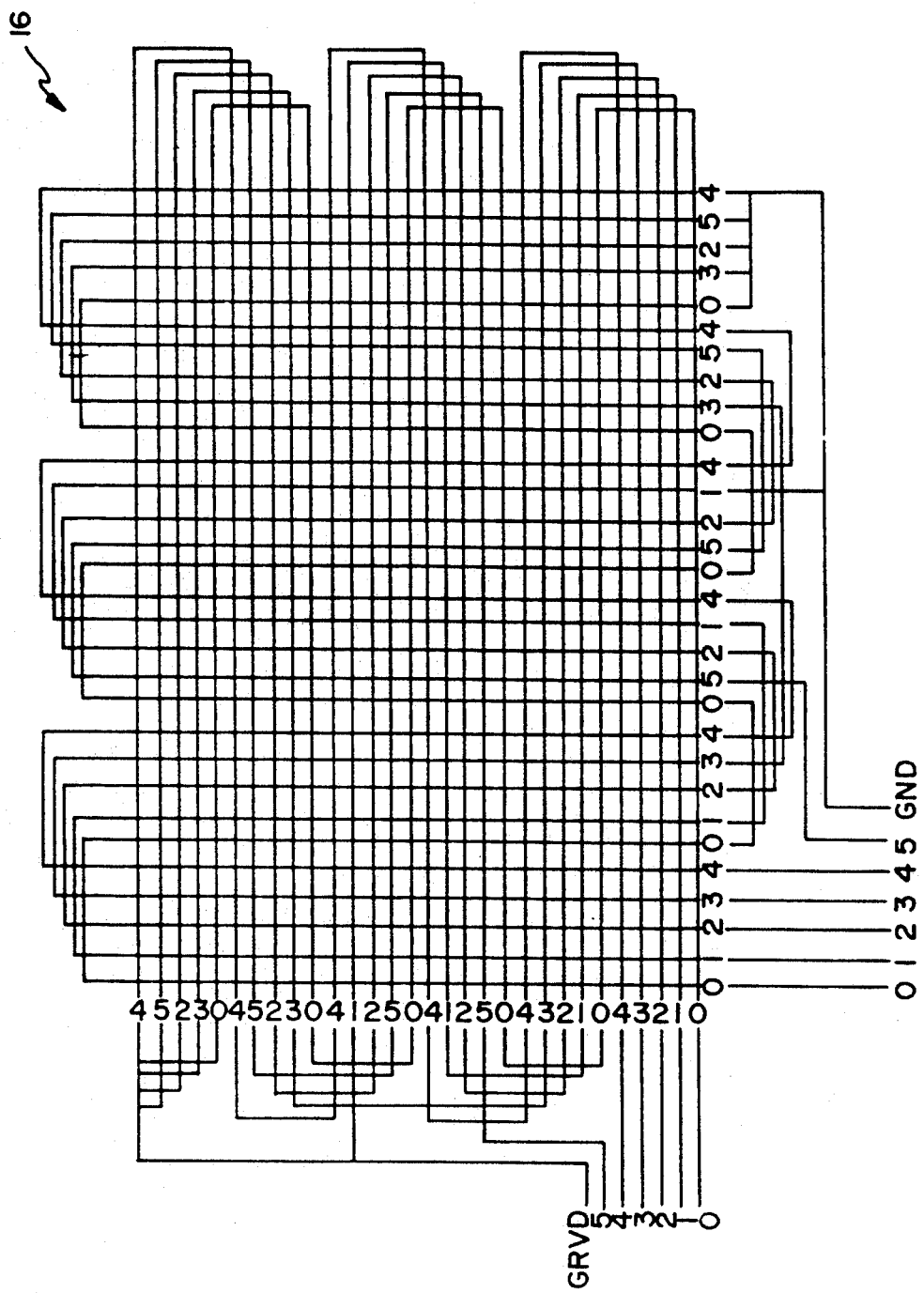
FIG. 3 is an illustration of the active grid area of a digitizer in accordance with an alternative embodiment of the invention, showing "Odd, Subtract Two, Add Extra Conductor" rotation sequencing.

FIG. 3 shows a grid active area 40 in accordance with an alternative embodiment of the invention, employing an interleaved, additional conductor as well as a rotation scheme. In that drawing, again, five conductors 12, 14 in each of the X- and Y-directions are looped back and forth in a parallel, spaced relationship across the active grid area so as to provide twenty crossing conductor segments, but, this time, in an "odd, subtract two, add, extra wire" pattern using a sixth conductor.

The interrelationship between the actual and virtual conductors in the grid of FIG. 3 can best be appreciated from the following table:

| CONDUCTOR SEGMENT NO. | CONDUCTOR NUMBER | LOOP NUMBER | ROTATION OFFSET |
| --- | --- | --- | --- |
| 0 | +0 | 1 | 0 |
| 1 | +1 | 1 | 0 |
| 2 | +2 | 1 | 0 |
| 3 | +3 | 1 | 0 |
| 4 | +4 | 1 | 0 |
| 5 | −0 | 1 | 0 |
| 6 | −1 | 1 | 0 |
| 7 | −2 | 1 | 0 |
| 8 | −3 | 1 | 0 |
| 9 | −4 | 1 | 0 |
| 10 | +0 | 2 | 0 |
| 11 | +5 | 2 | 2 |
| 12 | +2 | 2 | 0 |
| 13 | +1 | 2 | 2 |
| 14 | +4 | 2 | 0 |
| 15 | −0 | 2 | 0 |
| 16 | −5 | 2 | 2 |
| 17 | −2 | 2 | 0 |
| 18 | −1 | 2 | 2 |
| 19 | −4 | 2 | 0 |
| 20 | +0 | 3 | 0 |
| 21 | +3 | 3 | −4 |
| 22 | +2 | 3 | 0 |
| 23 | +5 | 3 | −4 |
| 24 | +4 | 3 | 0 |
| 25 | −0 | 3 | 0 |
| 26 | −3 | 3 | −4 |
| 27 | −2 | 3 | 0 |
| 28 | −5 | 3 | −4 |
| 29 | −4 | 3 | 0 |

As can be seen from the foregoing table, and as illustrated in FIG. 3, each odd numbered conductor (i.e., conductor nos. 1 and 3) in consecutive loops is shifted by one odd-numbered conductor position. In addition, an extra conductor, conductor no. 5, assumes its appropriate position in the second and subsequent loops, e.g., conductor no. 5 takes on the position in loop no. 2 that was held formerly by conductor no. 1 (i.e., the odd-numbered conductor that is offset by a negative four segments in the rotation) in loop no. 1.

Also in FIG. 3, conductor no. 3 shifts by two odd-numbered conductor positions, therefore not being part of any segments in loop no. 2 (i.e., taking on the "extra-conductor" role of conductor no. 5 in loop no. 1). Conductor no. 3 in loop no. 3, on the other hand, is located in the relative position of conductor no. 1 in loop no. 1. The position of the rest of the conductors can be appreciated in the light of the foregoing description and without further discussion herein.

"Even, Subtract One" 16-Conductor Active Grid

Figures 4, 5:
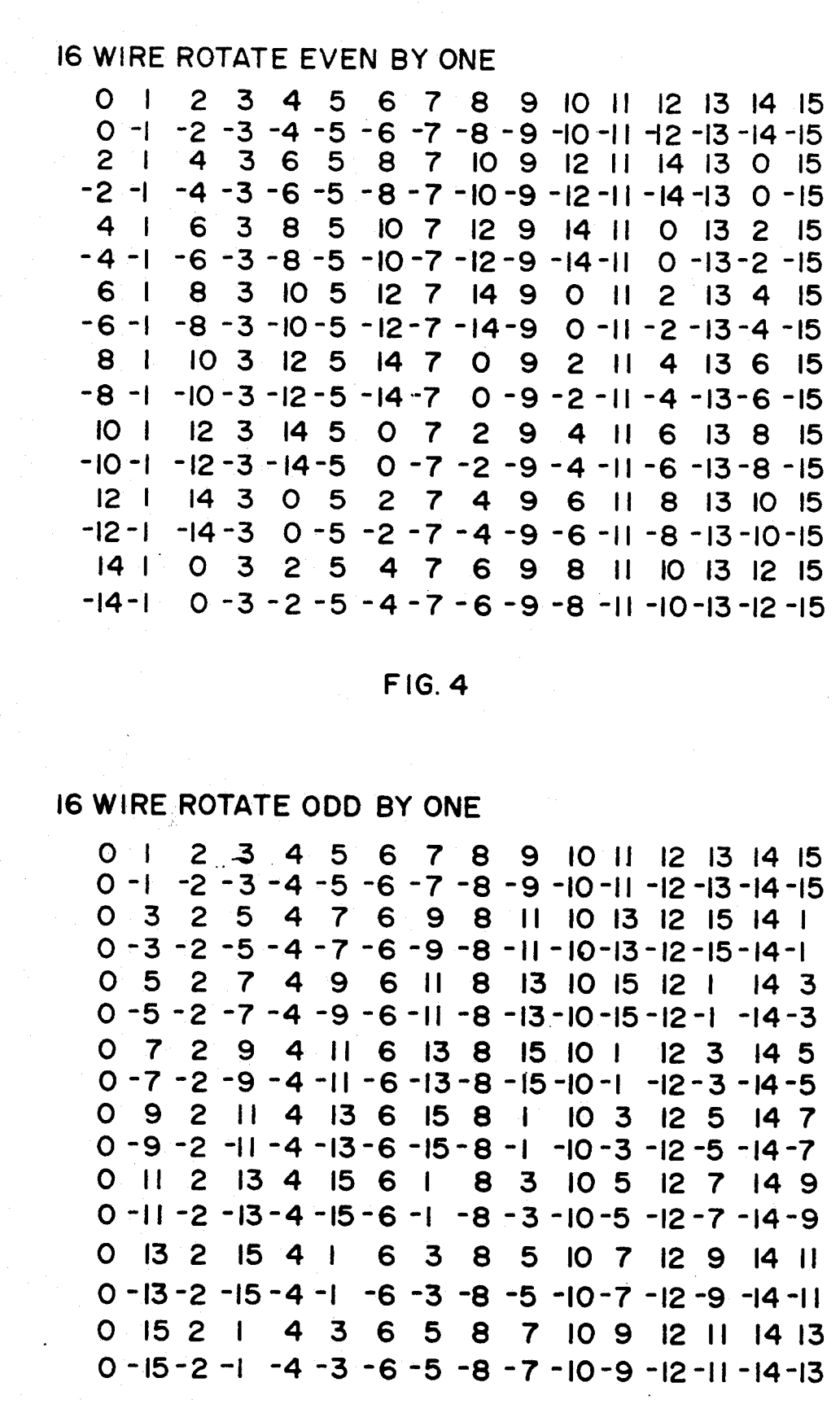

FIG. 4 shows a table representing all possible conductor positions of "Even, Subtract One" rotation sequencing of 16 conductors in accordance with the invention.

More specifically, in the first loop back and forth across the active area, the conductors no. 0 through 15 form 32 segments. The segments of the first loop that extend in a first direction across the grid can be numbered 0 through 15, and are represented by the first row of the table of FIG. 4. The segments of the second loop that extend in the opposite direction can be numbered 0 through −15, and are represented by the second row in the figure. This pattern of representing loops of conductors by pairs of rows continues for the balance of the figure.

In the second loop, the even-numbered conductors (i.e., conductors nos. 0, 2, 4, etc.) shift so that, for example, conductor no. 2 assumes the position in loop no. 2 that would normally be held by the conductor no. 0 if no rotation scheme were employed, conductor no. 4 assumes the position which would have been held by conductor no. 2, etc.

This shifting of a single, even position repeats for each loop of the conductors across the active area, yielding up to 16 different sequences or patterns of conductor segments, and up to 256 (i.e., 16 conductors times 16 patterns) conductor segments across the active area, while using merely 16 conductors.

"Odd, Subtract One" 16-Conductor Active Grid

FIG. 5 shows a table representing all possible conductor positions of "Odd, Subtract One" rotation sequencing of 16 conductors, again yielding 256 conductor segments across the active area.

It is not necessary for a digitizer in accordance with the invention to use all the loops that a particular number of conductors and sequencing scheme can provide. For example, a digitizer designed pursuant to FIG. 4 or 5 can have 7 loops or patterns (in each direction) of conductor segments, and thus the conductor positions represented in the last two rows of the figures would not be utilized. Nonetheless, this scheme still yields 224 conductor segments.

15-Conductor Active Grid

FIGS. 6 and 7 show tables representing all possible conductor positions of respective "Even, Subtract One" and "Odd, Subtract One" rotation sequencing of 15 conductors each. These arrangements each yield up to eight loops providing up to a maximum of 240 conductor segments, while still providing the leading and trailing end of each conductor on the same side of the active grid area.

Other Embodiments

The invention can be implemented in various other embodiments. For example, FIG. 8 shows a table representing all possible conductor positions of yet a further, more complicated rotation sequencing scheme involving an arrangement of 15/16 conductors rotated in an "Odd, Add One, Add New Odd Conductor, Remove One Odd." The arrangement provides a variation of the invention that is related to that shown in FIG. 3.

It will be apparent to those skilled in the art that the number of conductors used, and the choice of rotation sequencing of the segment positions will depend on the desired size of the grid active area and the desired resolution in the measurements of position provided by the digitizer.

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A loopback conductor arrangement for a digitizer grid, which employs rotation sequencing of the conductors, the arrangement comprising:
   A) a first set of conductors disposed generally parallel to a first direction; and
   B) a second set of conductors disposed generally parallel to a second direction,
   C) each of the first and second sets of conductors being looped back and forth in parallel, spaced relationship across the active grid area so as to define successive conductor loops, each conductor in each said conductor loop including first and second crossing conductor segments, and
   D) the position of the conductor segments of selected conductors in successive loops shifting by a constant rotation offset with respect to other conductor segments in said successive loops.

2. The loopback conductor arrangement in accordance with claim 1, wherein said selected conductors comprise every other conductor.

3. The loopback conductor arrangement in accordance with claim 1, wherein the conductors comprise a plurality of odd-numbered conductors and a plurality of even-numbered conductors, and the selected conductors comprise the odd-numbered conductors.

4. The loopback conductor arrangement in accordance with claim 1, wherein the conductors comprise a plurality of odd-numbered conductors and a plurality of even-numbered conductors, and the selected conductors comprise the even-numbered conductors.

5. The loopback conductor arrangement in accordance with claim 1, wherein the conductors comprise a plurality of odd-numbered conductors and a plurality of even-numbered conductors, and the selected conductors comprise all the conductors.

6. The loopback conductor arrangement in accordance with claim 5, wherein the even-numbered conductors are shifted by a first rotation offset and the odd-numbered conductors are shifted by a second rotation offset, said first and second rotation offsets being in opposite directions.

7. The loopback conductor arrangement in accordance with claim 1, further including an additional, interleaved conductor.

8. A digitizer comprising:
   A) a digitizer conductor grid;
   B) a movable instrument carrying an electrical coil; and
   C) a control circuit including an alternating-current source for energizing said electrical coil and thereby inducing a current in said digitizer conductor grid when said electrical coil is disposed proximate thereto, detection means for sensing said induced current, and processor means for determining the position of said coil with respect to said digitizer conductor grid; and D) said digitizer conductor grid comprising a loopback conductor arrangement employing rotation sequencing, the arrangement comprising
   i) a first set of conductors disposed generally parallel to a first direction;
   ii) a second set of conductors disposed generally parallel to a second direction,
   iii) each of the first and second sets of conductors being looped back and forth in parallel, spaced relationship across the active grid area so as to define successive conductor loops, each conductor in each said conductor loop including first and second crossing conductor segments, and
   iv) the position of the conductor segments of selected conductors in successive loops shifting by a constant rotation offset with respect to other conductor segments in said successive loops.

9. The digitizer in accordance with claim 8, wherein said selected conductors comprise every other conductor.

10. The digitizer in accordance with claim 8, wherein the conductors comprise a plurality of odd-numbered conductors and a plurality of even-numbered conductors, and the selected conductors comprise the odd-numbered conductors.

11. The loopback conductor arrangement in accordance with claim 8, wherein the conductors comprise a plurality of odd-numbered conductors and a plurality of even-numbered conductors, and the selected conductors comprise the even-numbered conductors.

12. The loopback conductor arrangement in accordance with claim 8, wherein the conductors comprise a plurality of odd-numbered conductors and a plurality of even-numbered conductors, and the selected conductors comprise all the conductors.

13. The loopback conductor arrangement in accordance with claim 12, wherein the even-numbered conductors are shifted by a first rotation offset and the odd-numbered conductors are shifted by a second rotation offset, said first and second rotation offsets being in opposite directions.

14. The loopback conductor arrangement in accordance with claim 8, further including an additional, interleaved conductor.

15. A digitizer grid employing rotation sequencing of a plurality of conductors, said digitizer grid comprising:
   A) a plurality of segments of a first set of conductors disposed generally parallel to a first direction and in spaced relation with one another across a grid active area; and
   B) a plurality of segments of a second set of conductors disposed generally parallel to a second direction and in spaced relation with one another across a grid active area, and
   C) the position of the conductor segments of selected conductors in said first and second sets being shifted by a pre-selected rotation offset with respect to other conductor segments thereof, said rotation offset being independent of the number of conductors in said first and second sets.

16. A method of arranging a plurality of conductors in a digitizer grid that employs rotation sequencing of the conductors, the method comprising the steps of:
   A) disposing a plurality of segments of a first set of conductors generally parallel to a first direction and in spaced relation with one another across a grid active area; and
   B) disposing a plurality of segments of a second set of conductors generally parallel to a second direction and in spaced relation with one another across a grid active area, and
   C) shifting the position of the conductor segments of selected conductors of said first and second sets by a pre-selected rotation offset with respect to other conductor segments, said rotation offset being independent of the number of conductors in said first and second sets.

* * * * *